United States Patent [19]
Hibbeler

[11] Patent Number: 6,067,348
[45] Date of Patent: May 23, 2000

[54] OUTBOUND MESSAGE PERSONALIZATION

[75] Inventor: Douglas S. Hibbeler, Omaha, Nebr.

[73] Assignee: Universal Services, Inc., Omaha, Nebr.

[21] Appl. No.: 09/128,775

[22] Filed: Aug. 4, 1998

[51] Int. Cl.[7] .................................................. H04M 3/432
[52] U.S. Cl. ................. 379/88.16; 379/67.1; 379/88.25; 379/88.27; 704/10
[58] Field of Search ............................... 379/67.1, 88.16, 379/88.25, 88.27, 265, 69, 101.01, 71, 76; 704/10, 11

[56] References Cited

U.S. PATENT DOCUMENTS

| | | | |
|---|---|---|---|
| 3,794,778 | 2/1974 | Smith et al. ............................... | 369/41 |
| 4,072,986 | 2/1978 | Heidergren ................................ | 360/12 |
| 4,439,635 | 3/1984 | Theis et al. ................................ | 379/87 |
| 4,545,043 | 10/1985 | Anderson et al. ......................... | 369/32 |
| 4,581,486 | 4/1986 | Matthews et al. .................... | 379/88.26 |
| 4,692,941 | 9/1987 | Jacks et al. ............................. | 704/260 |
| 4,706,270 | 11/1987 | Astegiano et al. ........................... | 379/2 |
| 4,856,066 | 8/1989 | Lemelson ................................ | 704/275 |
| 4,922,526 | 5/1990 | Morganstein et al. ................... | 379/157 |
| 5,029,200 | 7/1991 | Hass et al. ............................ | 379/88.18 |
| 5,133,004 | 7/1992 | Heileman, Jr. et al. ............. | 379/88.26 |
| 5,185,787 | 2/1993 | Katz ........................................ | 379/204 |
| 5,490,061 | 2/1996 | Tolin et al. ................................. | 704/2 |
| 5,511,112 | 4/1996 | Szlam ................................... | 379/88.25 |
| 5,536,171 | 7/1996 | Javkin et al. ............................ | 434/185 |
| 5,539,808 | 7/1996 | Inniss et al. .......................... | 379/88.22 |
| 5,559,867 | 9/1996 | Langsenkamp et al. .................. | 379/69 |
| 5,619,554 | 4/1997 | Hogan et al. ............................ | 379/88.1 |
| 5,621,790 | 4/1997 | Grossman et al. ....................... | 379/266 |
| 5,628,004 | 5/1997 | Gormley et al. ......................... | 707/104 |
| 5,796,791 | 8/1998 | Polcyn ..................................... | 379/265 |
| 5,819,265 | 10/1998 | Ravin et al. ................................ | 707/5 |

OTHER PUBLICATIONS

Merriam–Webster's Collegiate Dictionary, 10th Edition, ISBN 0–87779–709–9, p. 591, 1997.

*Primary Examiner*—Krista Zele
*Assistant Examiner*—Roland G. Foster
*Attorney, Agent, or Firm*—Rothwell, Figg, Ernst & Kurz

[57] ABSTRACT

A method and apparatus is described for outbound message personalization. A call list containing names and associated phone numbers are given as a starting point. A first or last name is compared to entries in a match table. If a match between names is found, then the index number corresponding to the entry is obtained. The index number is stored in the call list. When the message is ready to be delivered, the stored index number from the call list is retrieved and the stored-digital audio (as addressed by the index number) is converted to speech. Then an index number corresponding to a message body is used to retrieve and convert the message body into speech. In this manner, a personalized message can be created, wherein a large percentage of first names can be stored and used to personalize outbound messages.

11 Claims, 5 Drawing Sheets

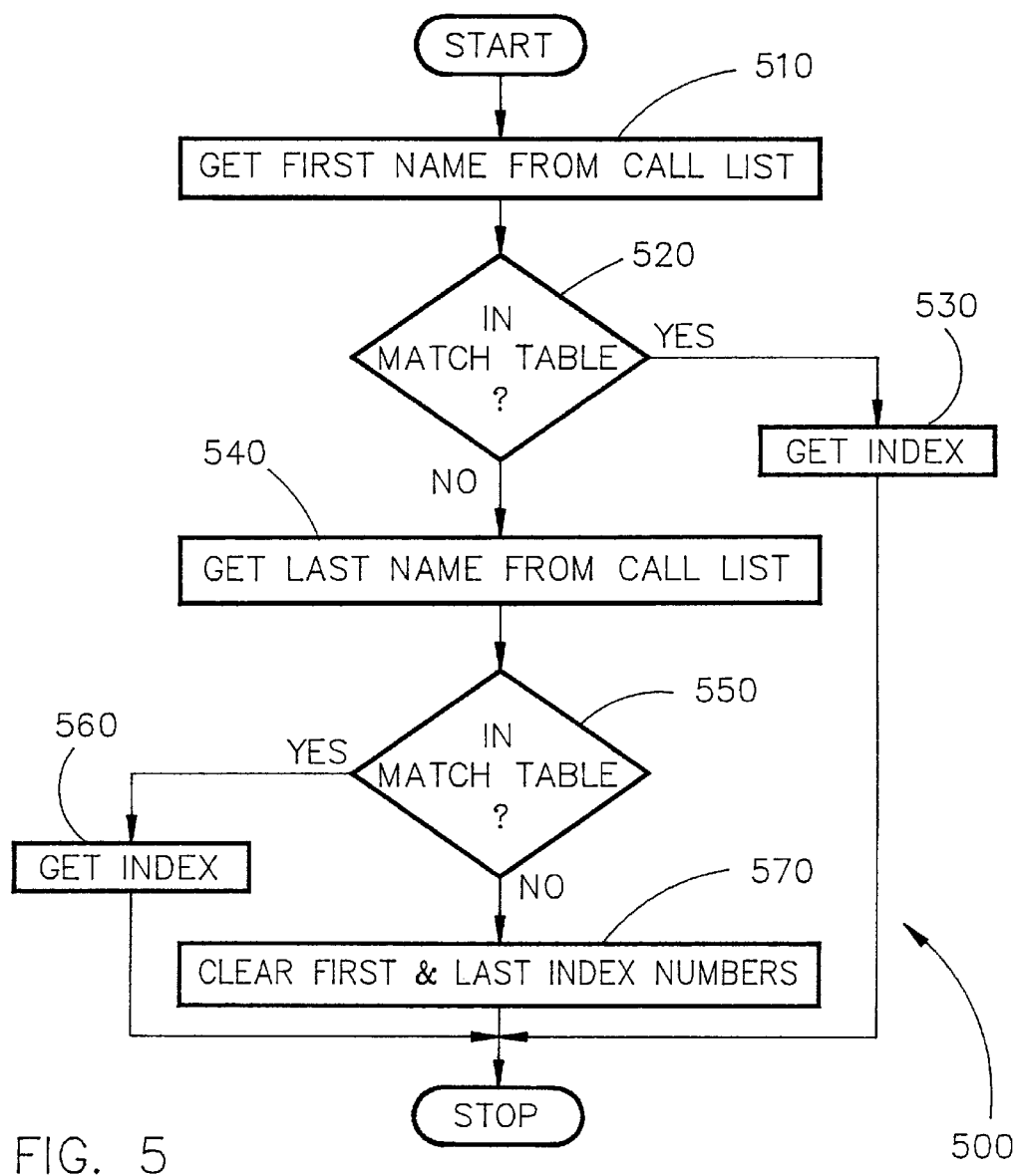

OUTBOUND MESSAGE PERSONALIZATION

BACKGROUND OF THE INVENTION

1. Field of the Invention

The present invention relates to outbound audio message formation, and more specifically to the personalization of an outbound audio message.

2. Description of Background Art

Information is an important part of everyday life. Disseminating information can be costly and time consuming. Situations exist where information needs to be sent to large numbers of individuals in the most efficient and effective way possible. Such information may take the form of warnings, directions, sales pitches, political persuasion or endorsements, messages to designated groups, medical information or reminders to the elderly, and a variety of types of notices, to name but a few.

Although printed distribution of information is relatively inexpensive, audio delivery is quicker and more effective. Printed items take longer to deliver and may be easily ignored, lost, or discarded. The need has been met in the past by pre-recorded audio messages that were delivered to large numbers of people via telephone. With the advent of powerful and cheap computers, telephone message delivery has become powerful, efficient, and cost effective.

Telephone message delivery has generally been done by recording a message having a generic greeting embedded therein. A computer or calling machine dials telephone numbers from a list of persons to be contacted. At the appropriate time, the pre-recorded message is played over the telephone when the connection is completed.

A pre-recorded generic message has several drawbacks. First, a generic message appears to be very impersonal to a recipient, and may be disregarded. Second, it is common knowledge that the use of a recipient's name will catch the attention of that person. Third, a generic message is less flexible, and the entire message must be discarded if any change must be made to the message.

What is needed therefore is an outbound automated message formation capability wherein the message can be personalized to fit the recipient.

SUMMARY OF THE INVENTION

It is therefore an object of the invention to provide a message personalization method and apparatus capable of generating a personalized audio message.

It is another object of the invention to provide an audio message having a root name used to personalize a variety of first names.

It is yet another object of the invention to provide a personalized greeting using a last name.

It is yet another object of the invention to provide a generic greeting if the first or last name of the recipient does not match the stored names.

It is yet another object of the invention to provide a group message that is targeted at a specific group as part of a personalized greeting.

A method for personalizing a message is provided according to a first aspect of the invention. The method for personalizing a message comprises the steps of storing greeting segments in a storage area in a predetermined order, assigning a unique index number to each greeting segment of the plurality of greeting segments, recalling a greeting segment from the storage area using the unique index number, and combining the greeting segment with a message body to form a personalized message.

A method for personalizing a message is provided according to a second aspect of the invention. The method comprises the steps of storing a message body in a storage area, storing a plurality of greeting segments in the storage area in a predetermined order, assigning a unique index number to each greeting segment of the plurality of greeting segments, recalling the message body from the storage area, recalling a greeting segment from the storage area using the unique index number, and combining the greeting segment and the message body to form a personalized message.

An apparatus for creating a personalized message is provided according to a third aspect of the invention. The apparatus for creating a personalized message comprises a storage area containing a plurality of greeting segments with each greeting segment of the plurality of greeting segments being associated with a corresponding index number, a call list containing a name of a recipient, a match table containing a name and the corresponding index number that maps the name to a root name, a communication link for transmitting the personalized message, and a message controller for processing the call list and forming the personalized message, and capable of transmitting the personalized message over the communication link.

The above and other objects, features and advantages of the present invention will become clear from the following description of the preferred embodiment thereof, taken in conjunction with the accompanying drawings.

BRIEF DESCRIPTION OF THE DRAWINGS

FIG. 4 is a match table 400 illustrating how a recipient name is mapped to a root name;

FIG. 5 is a flowchart 500 of the method of completing the call list 300 using the match table 400;

DETAILED DESCRIPTION OF THE PREFERRED EMBODIMENTS

Figure 1:
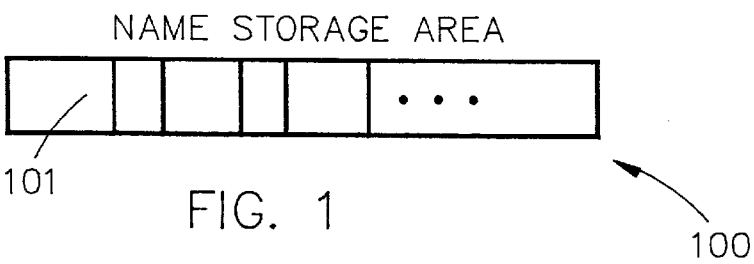
FIG. 1 shows a name storage area 100 illustrating the multiple storage cells.

FIG. 1 shows a storage area 100 used to store an array of greeting segments to be used in the message personalization. Storage area 100 may be provided in a storage medium such as read-only memory (ROM), random-access memory (RAM), optical or magnetic disk, and equivalents thereof. The storage area 100 has multiple storage cells 101, with each storage cell capable of storing one recorded audio segment, such as, for example, a greeting segment or message body. The storage area 100 can be used to store any manner and number of segments. In the preferred embodiment 1,500 storage cells are provided through the use of a computer program entitled VFEdit, available from Voice Information Systems Incorporated. The VFEdit computer program is used to record individual greeting segments, with each recorded segment being assigned an index number from 1 to 1,500. In the preferred embodiment the greeting contains a salutation and a first name, such as "Hi, Jim." The index numbers are pointers to the start of each greeting segment (i.e., an address pointer). The size of each greeting segment is dynamic, and is set when each individual greeting segment is recorded. In the preferred embodiment, a list of greetings is generated including root names and last names, with each root name or last name having a pre-assigned index number. The list of greetings is recorded by a speaker, and each recorded greeting is stored at its pre-assigned storage cell and index. The person recording the greetings may be a voice talent or recognizable personage, in order for the personalized message to have additional impact.

Figure 2:
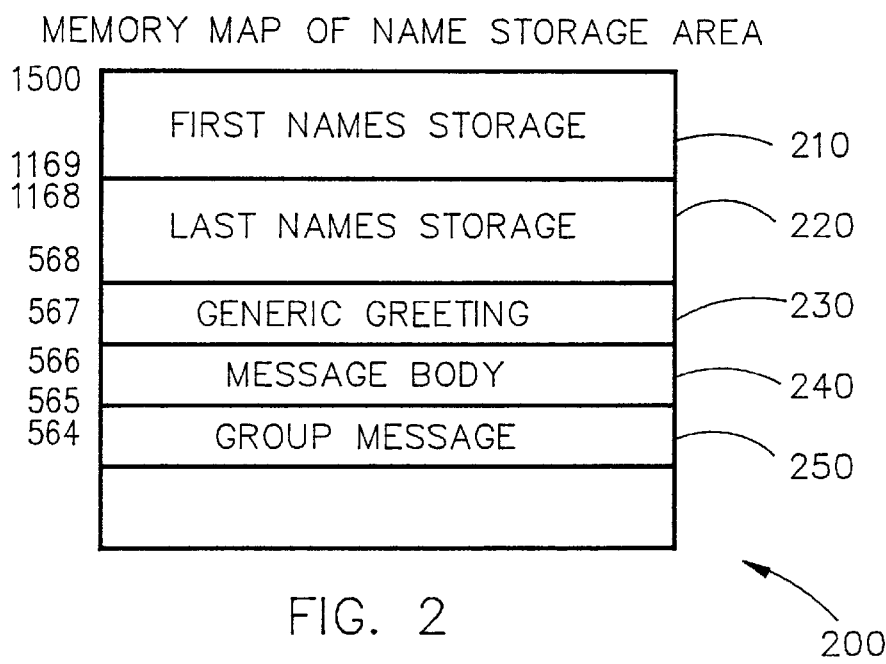
FIG. 2 is a memory map 200 of the name storage area 100 illustrating the allocation of the storage cells.

FIG. 2 shows a memory map 200 of the storage area 100 of the preferred embodiment. The memory map 200 is divided into separate areas comprising a first names storage 210, a last names storage 220, a generic greeting storage 230, a message body storage 240, and a group message storage 250. The above storage types are optional, and additionally other storage types could be added, such as a variety of message body segments. In the preferred embodiment, the first names storage 210 has 331 individual storage cells extending from index 1169 to index 1500, the last names storage has 600 individual storage cells extending from index 568 to index 1168, the generic greeting is stored at index 567, the message body is stored at index 566, and the optional group message or other optional messages may be stored anywhere from index 565 on down. The memory map is one possible configuration, and the various segments are stored as shown purely for order and convenience, as they could be stored in any variety of configurations.

Figure 3:
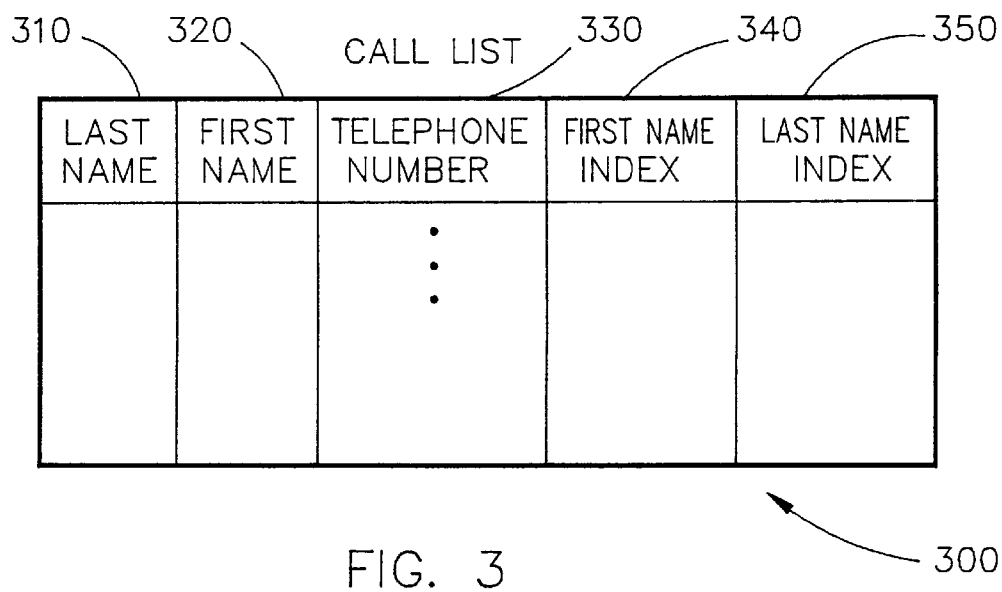
FIG. 3 is a call list 300 illustrating the information stored therein.

FIG. 3 shows a call list 300 of the preferred embodiment. The call list 300 is comprised of multiple cells, with each cell including a last name 310, a first name 320, a telephone number 330, a first name index number 340, and a last name index number 350. It is understood that the call list 300 may additionally contain other data fields for other uses, such as a field used to specify a message body index if more than one message body is to be used. In an alternative embodiment, additional fields may be included specifying demographic or psychographic codes which may be used to specify one of a multitude of message bodies. Before the personalization is performed, the call list 300 contains a last name, a first name, and a telephone number. After the personalization is performed, the first name index 340 will receive an index number of a root name that can be used to greet the message recipient. If a first name match was not found, then the last name index 350 will receive an index number of a last name that can be used to greet the message recipient. If a last name match was not found, then both the first name index 340 and the last name index 350 will remain empty.

The call list 300 is used by the message controller (described below) and a telecommunications card to perform the telephone dialing. The stored greeting segment index, whether it be the first name index or the last name index, is used to direct the apparatus to a proper greeting segment in memory map 200 to be converted into a personalized audio greeting.

FIG. 4 is a match table 400 that is employed by the preferred embodiment in order to assign a root name to a first name. The match table 400 is comprised of multiple cells, with each cell being further comprised of a name 410 and an index number 420. The index number 420 maps the name 410 to a root name stored in the storage area 100. When a match is found between a name in the call list 300 and a name 410 in the match table 400, the index number 420 is stored in the first name index 340 of the call list 300. By using the match table 400, a large percentage of the first names and a smaller percentage of last names given in the call list 300 may be converted into a root name. The root name is here defined as the simplest version of a name or names. For example, portrayed in the match table 400, are the names James, Jimmy, and Jim, which through the use of the match table 400 are all mapped to the root name Jim. In this manner, most popular names, and their various forms, can be mapped to a root name that can be used to personalize a message, resulting in a smaller and simpler database of names. In the preferred embodiment, an additional entry is the root name 430, which is used in the preferred embodiment to show the root name that corresponds to the index number 420. The root name 430 may optionally be left out, as the index number 420 can be used to obtain the root name.

FIG. 5 is a flowchart 500 illustrating the creation of the call list 300 by use of the match table 400. In step 510, the first name of the intended recipient is obtained from the first name storage 320 of the call list 300. In step 520, the first name from the call list 300 is compared to the name entries 410 of the match table 400. If a match is found, then in step 530 the corresponding index number 420 is obtained. The index number 420 is put in the first name index storage 340 of the call list 300, and the flowchart terminates. If a match is not found, then preferably in step 540 the last name of the recipient is obtained from the last name storage 310 of the call list 300. In step 550, the last name is compared to the name entries 410 of the match table 400. If a match is found, then in step 560 the corresponding index number is obtained and put in the last name index storage 350 of the call list 300, and the flowchart terminates. If a match is not found, then in step 570 both the first name index storage 340 and the last name index storage 350 of the call list 300 are given a value of zero. Alternatively, both the first name and the last name may be matched, and the resulting personalized message may contain both the first and last names. In yet another alternative embodiment, the process does not search for a last name but terminates after searching for a first name only.

Figure 6:
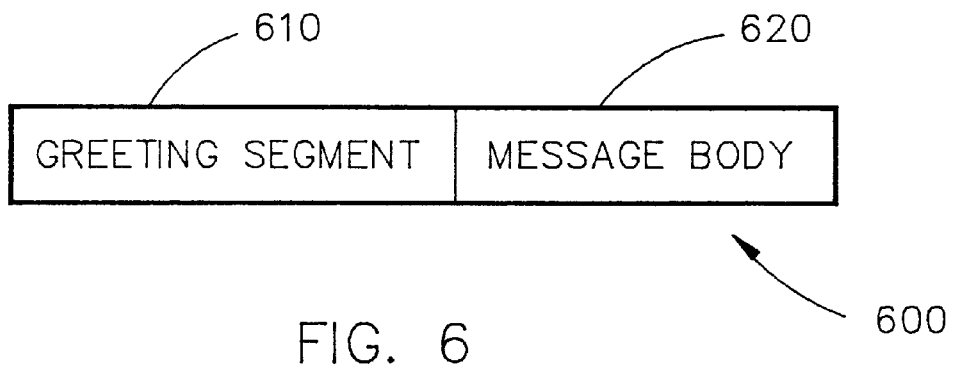
FIG. 6 is a depiction of a personalized message 600 having a greeting segment 610 and a message body 620.

FIG. 6 is an illustration of a personalized message 600 having a greeting segment 610 and a message body 620. The greeting segment 610 in the preferred embodiment may be of the form "Hi, Jim," "Hello, Jim," or "Hey, Jim," with the greeting segment 610 including either a first or last name. If the greeting segment includes a last name, it may be of the form "Hello Smith." The message body 620 contains a substantive message, including a prefix such as "family" or "residence."

Figure 7:
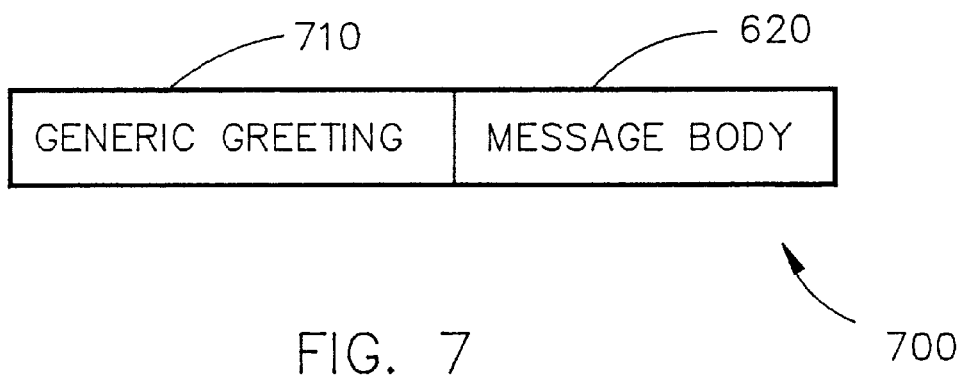
FIG. 7 is a depiction of a personalized message 700 having a generic greeting segment 710 and a message body 620.

FIG. 7 is an illustration of a generic message 700 to be used as an alternative to the personalized message 600. The generic message 700 has a generic greeting segment 710 and a message body 720. In the preferred embodiment, if no name match is found, both the first name index and the last name index remain empty. The empty indexes signal that a generic greeting must be used. In an alternative embodiment, the index number of the generic greeting may be stored in either the first name index 340 of the last name index 350 of the call list 300.

Figure 8:
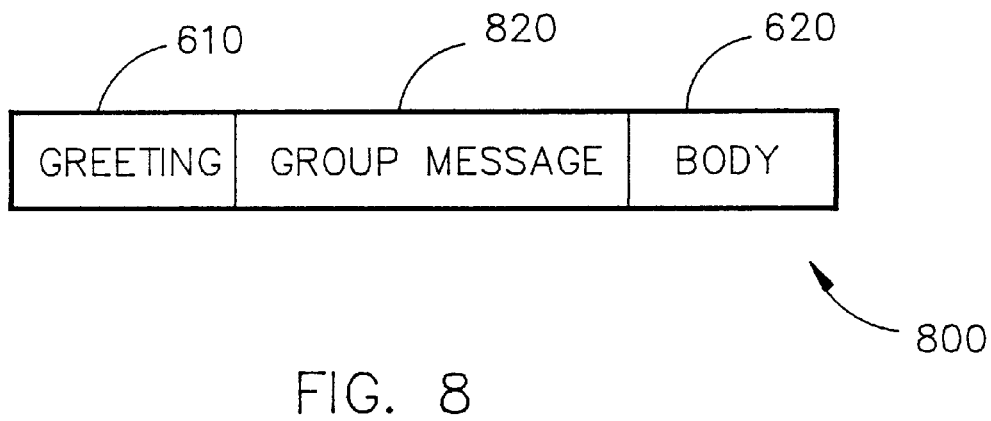
FIG. 8 is a depiction of a personalized message 800 having a greeting segment 610, a group message 820, and a message body 620.

FIG. 8 is an illustration of a personalized group message 800. The personalized group message 800 is another alternative embodiment comprised of a greeting segment 610, a group message 820, and a message body 620. The group message 820 includes a special message identifying the group and personalized toward the group as an additional personalization. An example is a personalized message from a CEO of a corporation, wherein the group message could identify a group such as the shareholders of the corporation, as in "Hi, Jim, as a shareholder of XYZ Corp., I want to tell you. . . ."

Figure 9:
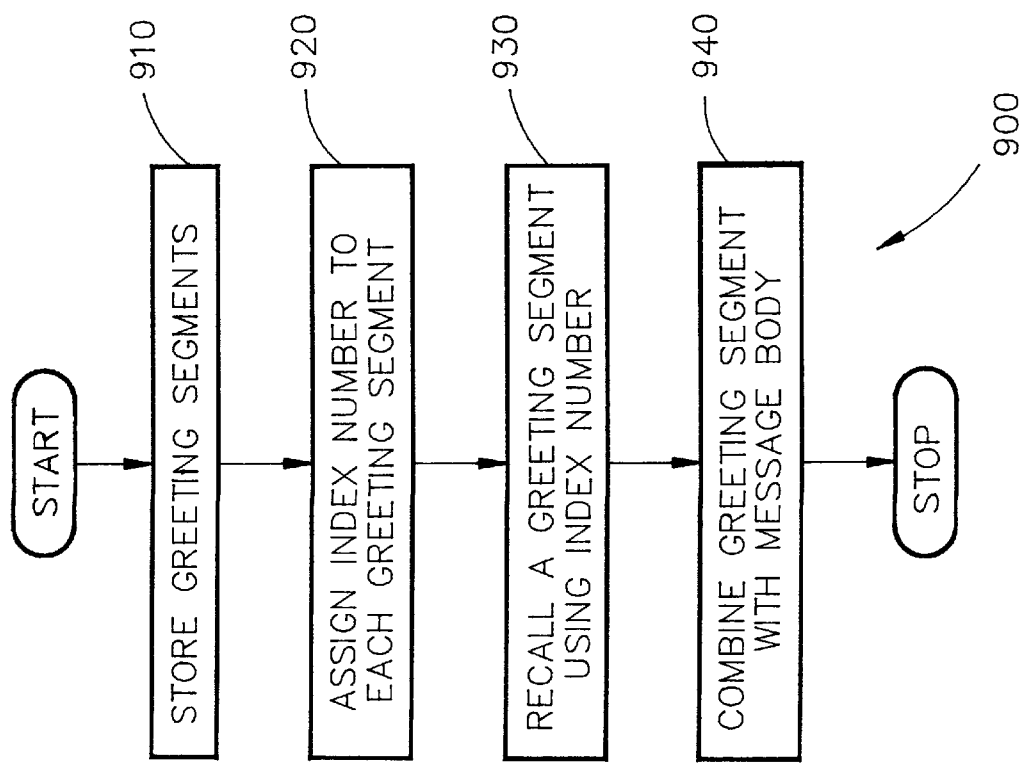
FIG. 9 is a flowchart 900 of an embodiment of the method of creating a personalized message.

FIG. 9 is a flowchart 900 of an audio message recording, storage and retrieval process of the present invention. In step 910, the individual greeting segments are stored in the first names storage 210 or last names storage 220 of the storage area 100. In the preferred embodiment the greeting segments are stored in the name storage area 100 as digital audio. However, the data could alternatively be stored as text, and converted into audio speech through a text-to-speech conversion. In step 920 an index number is assigned to each greeting segment stored in the name storage area 100. In the preferred embodiment, the memory map 200 has a predetermined order, and the greeting segments are stored at their pre-assigned indexes. In step 930, in placing a telephone call a greeting segment is recalled from the storage area 100 using the appropriate index number. If the index number is zero, the generic greeting is recalled. The index number for each personalized message recipient is obtained from the call list 300. The call list 300 dictates the greeting segment to be used for the current telephone call. In step 940 the greeting segment index number and the message body index number (and the corresponding digital audio information) are recalled in sequence and converted into speech. In the preferred embodiment, the segments are combined when the stored information is converted into audio, in effect combining them by playing the greeting and the body in a sequential manner. However, the segments could be alternatively combined in a buffer (or other storage) and then converted into speech.

Figure 10:
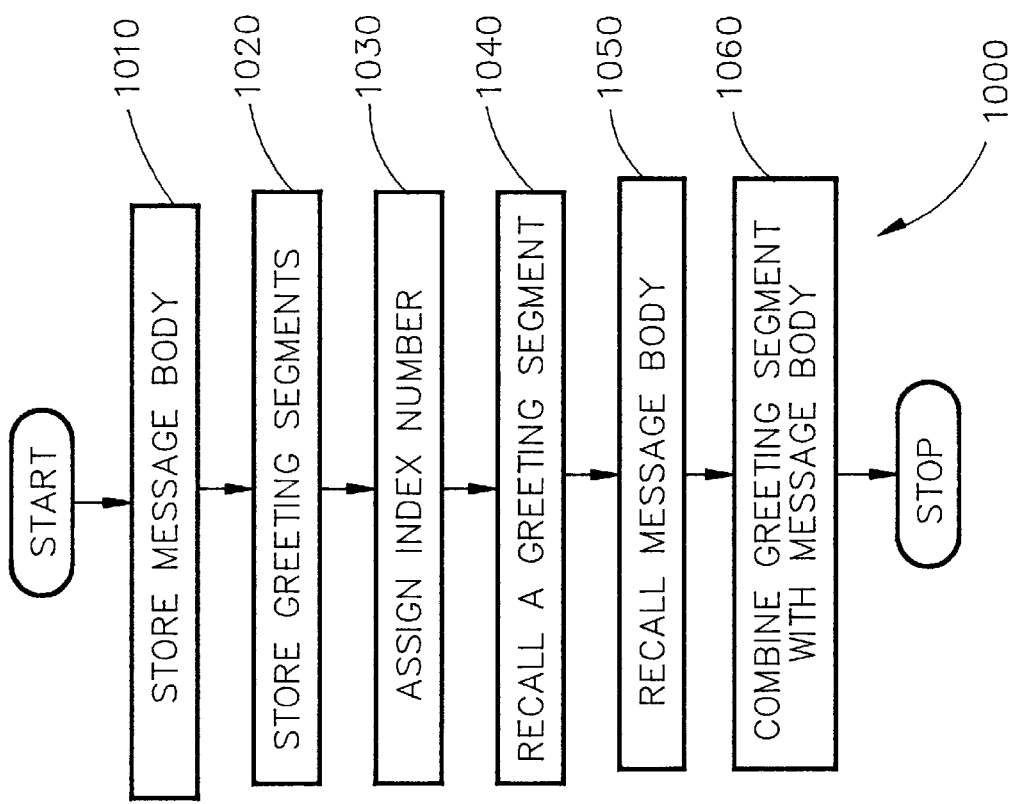
FIG. 10 is a flowchart 1000 of a preferred embodiment of the method of creating a personalized message.

FIG. 10 is a flowchart 1000 of an embodiment of the present invention relating to creation of a personalized greeting message and playing of a message during a telephone call to a designated recipient. In step 1010, the message body is stored in the message body storage 240 of the storage area 100. The message body can be a single message or multiple messages that can be used to tailor the entire message to each individual recipient. In step 1020, the individual greeting segments are stored in the first names storage 210 or last names storage 220 of the storage area 100. In the preferred embodiment the greeting segments are stored as digital audio. However, the data could alternatively be stored as text, and converted into audio speech through a text-to-speech conversion. In step 1030, an index number is assigned to each greeting segment stored in the name storage area 100 (and to each stored message body). In the preferred embodiment, the memory map 200 has a predetermined order, and the greeting segments are stored at pre-assigned indexes. In step 1040, the greeting segment is recalled from the storage area 100 using an appropriate index number. If the index number is zero, the generic greeting is recalled. The index number for each personalized message recipient is obtained from the call list 300. The call list 300 dictates the greeting segment (and optionally the message body) to be used for each recipient. In step 1050, the message body is recalled from the storage area 100 using the message body index number. In step 1060 the greeting segment index number and the message body index number (and the corresponding digital audio information) are recalled in sequence and converted into speech. In the preferred embodiment, the segments are combined when the stored information is converted into audio, in effect combining them by playing the greeting and the body in a sequential manner. However, the segments could be alternatively combined in a buffer (or other storage) and then converted into speech.

According to an alternative embodiment (not shown), a group message 800 is formed by additionally recalling a group message from the name storage area 100 using a group message index number. The group message index number is placed into a group message index (not shown) in the call list 300. The group message is preferably positioned after the greeting segment and before the message body, but it could also take the place of the greeting segment.

Figure 11:
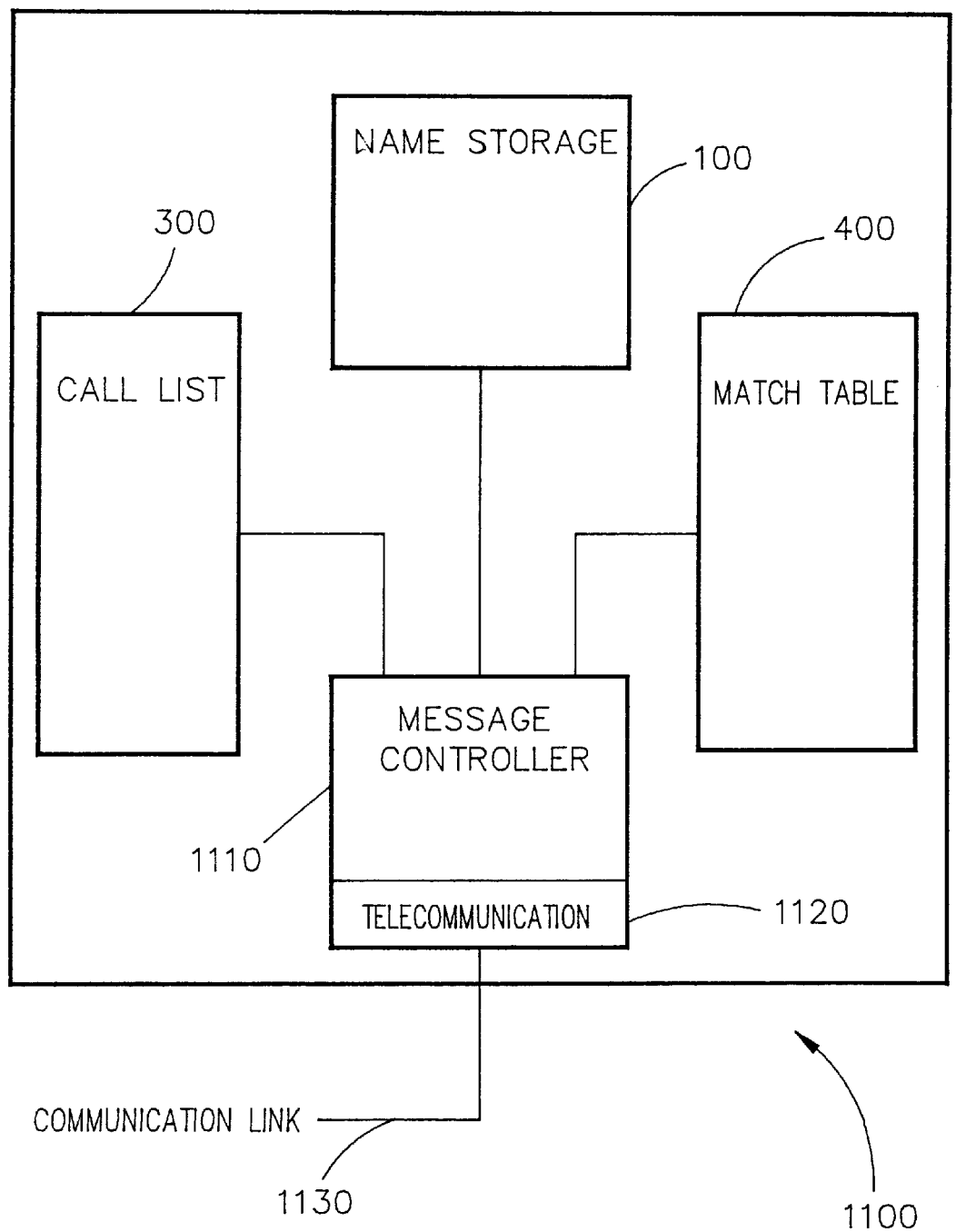
FIG. 11 is an apparatus 110 for creating a personalized message.

FIG. 11 shows an apparatus 1100 for creating, storing and playing messages according to one preferred embodiment of the invention. The apparatus 1100 comprises a call list 300, a name storage area 100, a match table 400, a message controller 1110, a telecommunications card 1120, and a communication link 1130. The message controller 1110 may be any type of general purpose computer. In the preferred embodiment, the call list 300, the name storage 100, and the match table 400 are all implemented in the random access memory (RAM) of a general-purpose computer. It will be obvious to one skilled in the art that the three storage areas mentioned above could equally well be implemented in other types of memory, such as on a hard drive. In the preferred embodiment, the communication link 1130 is a telephone line. The telecommunications card 1120 is capable of handling communications over multiple phone lines and hence able to rapidly transmit outbound messages. In the preferred embodiment, the telecommunications card is a telephony card capable of transmitting telephone messages over a telephone line. The telephony card in the preferred embodiment may be a model D/240SC-T1 or DM3, available from Dialogic Corporation, or alternatively a model Quad-T or Quad-E (European format), available from Natural Micro Systems. In an alternative embodiment, the telecommunications card is an Internet card capable of transmitting messages in a digital format over the Internet.

In operation, the message controller 1110 is given the call list 300, but without the index numbers. The message controller 1110 reads the first name from the call list 300 and tries to find the first name in the match table 400. If the first name is found, then the corresponding index number is placed in the first name storage 340 of the call list 300. If the first name does not match up, then the last name is read out of the call list 300 and the message controller 1110 tries to match the last name to an entry in the match table 400. If the last name is found, then the corresponding index number is placed in the last name storage 340 of the call list 300. If the last name does not match up, then preferably zeros are placed in the first name storage 340 and the last name storage 350 of the call list 300. Once the call list 300 is completed, the message controller 1110 goes through each entry, finds the greeting segment index number (either the first name index number, or the last name index number if the first name index number is empty, or the generic greeting if both are empty), and converts the stored greeting into a audio message. Sequentially, the message controller 1110 then converts the stored message body into an audio message. In this manner, all persons in the call list 300 may receive a personalized telephone message. Alternatively, the message controller 1110 may dial and transmit each outbound message as it is completed.

While the invention has been disclosed in detail above, the invention is not intended to be limited to the invention as disclosed. It is evident that those skilled in the art may now make numerous uses and modifications of and departures from the specific embodiments described herein without departing from the inventive concepts.

What is claimed is:

1. An apparatus for creating a personalized message, comprising:
   a storage area containing a plurality of personal greeting root name segments, with each personal greeting root name segment of said plurality of personal greeting root name segments being associated with a corresponding index number;
   a call list containing recipient names of at least one recipient who is to receive said message;
   a match table containing at least one recipient name and a corresponding index number that maps said recipient name to a personal greeting root name segment, wherein said index number corresponds to at least one recipient name;
   a communication link for transmitting said personalized message; and
   a message controller for processing said call list and forming said personalized message, and for transmitting said personalized message over said communication link, including means for retrieving an index number from said match table corresponding to a recipient name in said call list, retrieving the personal greeting root name segment associated with said index number from said storage area, and combining said personal greeting root name segment with a stored message body.

2. The apparatus of claim 1, wherein said plurality of personal greeting root name segments include a first name that can be matched to an intended recipient.

3. The apparatus of claim 1, wherein said plurality of personal greeting root name segments include a last name that can be matched to an intended recipient.

4. The apparatus of claim 1, wherein said plurality of personal greeting root name segments includes a generic greeting that can be used when no first or last name can be matched to an intended recipient.

5. The apparatus of claim 4, wherein said message body is contained within said storage area.

6. The apparatus of claim 5, wherein said storage area contains a plurality of said message bodies.

7. The apparatus of claim 4, wherein said storage area contains a group message.

8. The apparatus of claim 4, wherein said call list comprises a plurality of entries, with an entry further comprising a last name, a first name, a phone number, a first name index, and a last name index.

9. A method for personalizing a recorded audio message, comprising the steps of:
   storing a plurality of personal greeting root name segment data representing audible greetings in a storage area in a predetermined order;
   assigning a unique index number to each personal greeting root name segment of said plurality of personal greeting root name segment data;
   acquiring a call recipient name from a call list;
   matching said call recipient name to an identical name in a match table to acquire a unique index number corresponding to said call recipient name, said match table capable of containing a plurality of said call recipient names mapping to said unique index number and therefore mapping said call recipient name to a personal greeting root name segment corresponding to said unique index number;
   recalling a personal greeting root name segment from said storage area using said unique index number; and
   combining said personal greeting root name segment with a stored message body to form a personalized message.

10. The method of claim 9, wherein said call recipient name is a first name.

11. The method of claim 9, wherein said call recipient name is a last name.

* * * * *